United States Patent Office 3,783,109
Patented Jan. 1, 1974

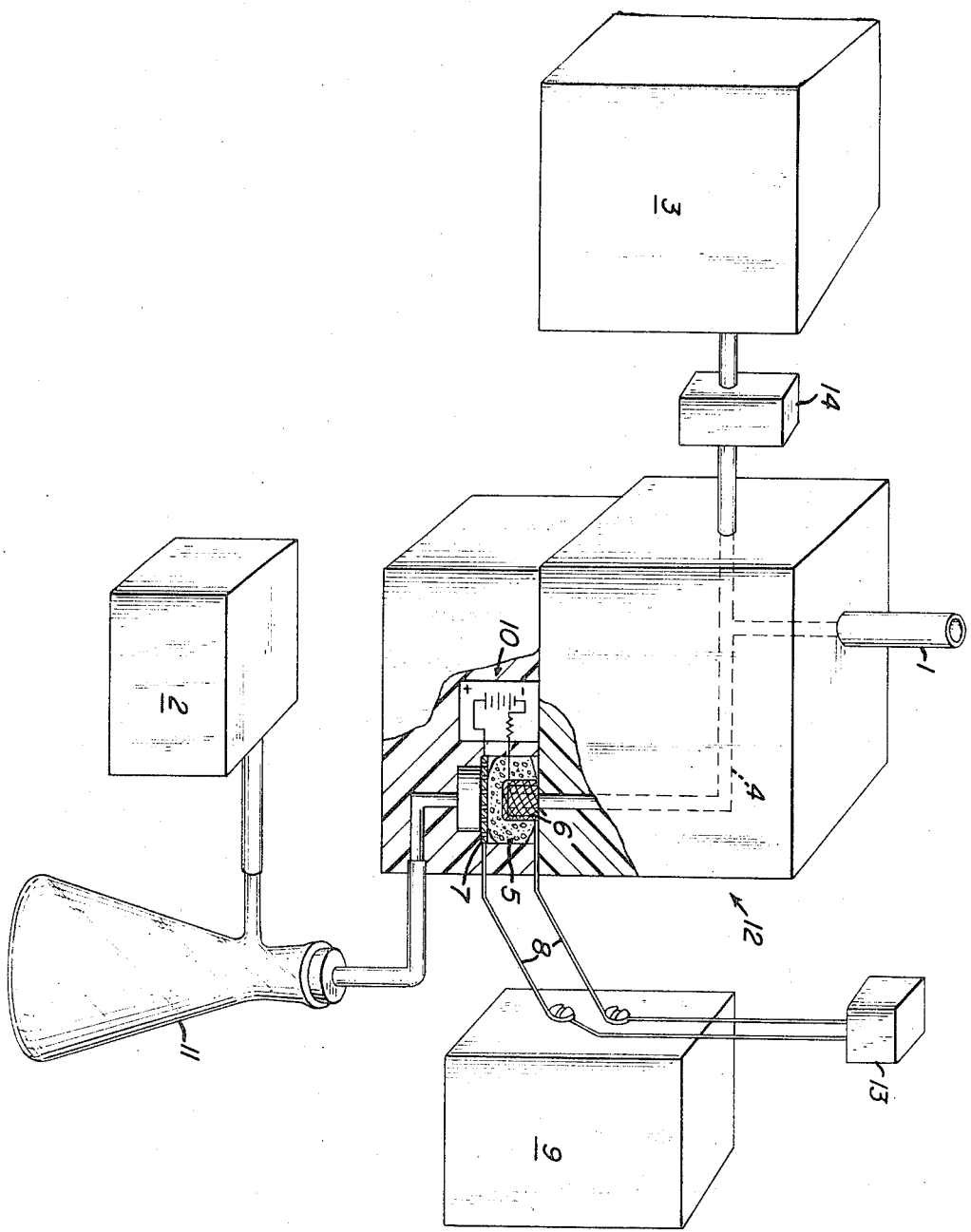

3,783,109
AIR POLLUTION MONITORING METHOD
Louis H. Goodson, Kansas City, and William B. Jacobs, Independence, Mo., and Andrew W. Davis, Baltimore, Md., assignors to the United States of America as represented by the Secretary of the Army
Original application Dec. 22, 1970, Ser. No. 100,741, now Patent No. 3,715,298, dated Feb. 6, 1973. Divided and this application Mar. 24, 1972, Ser. No. 237,665
Int. Cl. G01n 27/46
U.S. Cl. 204—1 T    3 Claims

ABSTRACT OF THE DISCLOSURE

A method for continuous monitoring of an airstream for the presence of pollutants therein by effective absorption of the pollutants in an absorbing solution by creating turbulent flow of the airstream and the absorbing solution prior to passing the absorbing solution containing the pollutants to an electrochemical cell whereby any electrical change produced in the electrodes of the electrochemical cell denotes the presence of pollutants; any electrical change being monitored by conventional means.

---

This application is a division of Ser. No. 100,741, filed Dec. 22, 1970 and now U.S. Pat. No. 3,715,298, issued Feb. 6, 1973.

DEDICATORY CLAUSE

The invention described herein may be manufactured, used, and licensed by or for the Government for governmental purposes without the payment to us of any royalty thereon.

SPECIFICATION

Our invention relates to a method for continuous monitoring of airstreams for the presence of various types of pollutants; such as reducing substances, enzyme inhibiting substances, and oxidizing substances.

Prior art analytical chemical analyses were conducted by means such as polarography, coulometry, chronopotentiometry, amperometry, and similar electrochemical analysis which involved the use of a static or stirred solution in which constant amounts of substances to be analyzed were reduced, oxidized, plated, polarized or otherwise used to produce an endpoint which could be related to the quantity of substance present which was being analyzed. However, it was not possible to conduct the aforementioned prior art electrochemical operations on a continuous basis or to produce results available on a real time basis. Our invention was conceived and reduced to practice to solve the above described problem and to satisfy the long felt need for a system and method having a sufficient sensitivity and speed of response to enable airborne and/or aerosolized substances present in trace amounts to be detected and/or quantitated in a matter of a few seconds.

A principal object of our invention is to provide a method to detect and/or quantitate trace amounts of airborne and/or aerosolized substances in a few seconds.

Another object of our invention is to provide a method to monitor the difference in level of pollutants in two or more airstreams.

Other objects will be obvious from or will appear in the specification hereinafter set forth.

The drawing shows the system for use in our method of monitoring any airborne and/or aerosolized pollutants and will now be described in detail as follows.

An airstream to be monitored is drawn into inlet 1 by means of conventional air pump 2; pump 2 also serving to circulate the airstream and below described absorbing solution through the system after absorption in conduit 4. Simultaneously, an absorbing solution is drawn from reservoir 3 by auxiliary pump 14 to mix with the airstream in conduit 4, an optimum small diameter conduit of about 0.070 of an inch inside diameter. Due to the airstream and absorbing solution passing from an airstream larger diameter conduit of about 0.090 of an inch to conduit 4, turbulence is produced in the airstream and absorbing solution flow through conduit 4 which results in effective and efficient scrubbing of the airstream and absorbing of any pollutants in the airstream by the absorbing solution; conduit 4 being designed to be utilized with a cathode of 0.157 of an inch diameter and a ⅜ of an inch diameter anode. While particular conduit and electrode sizes have been stated, the stated sizes are merely exemplary, and suitable sizes for a particular application are selectable within the skill of the art. The only size criticality is that the airstream enter a smaller size conduit from a larger size conduit to produce turbulent flow. The solution containing any absorbed pollutant is taken up by open-cell material 5, such as urethane foam, located between any suitable and conventional electrodes, such as gray platinum cathode 6 and gray platinum anode 7; material 5 permitting a film flow of solution between electrodes 6 and 7 to produce rapid electrode response. Electrodes 6 and 7 can be made of either the same electrode materials or different electrode materials in the conventional manner to suit a given application within the skill of the art. Material 5 can also be used as a support for materials to suit a given application within the skill of the art, such as a catalyst or an enzyme. Aforementioned solution containing any pollutant acts as an electrolyte, and the potential or current of electrodes 6 and 7 are monitored by connecting lead wires between the electrodes and a conventional recording means 9. An electrical current is passed through electrodes 6 and 7 by the circuit shown at 10 in the conventional manner; the current being passed as shown in the drawing when similar electrode materials are used and by the galvanic current produced within the electrodes and without the necessity for circuit 10 when dissimilar electrode materials are used. The airstream with pollutants removed and the absorbing solution containing the pollutants is continued to be drawn through the system by pump 2 to collect the absorbing solution in trap 11 and to exhaust the airstream with pollutants removed from pump 2 in the conventional manner. In addition to connecting our system to a recording means, it can also be connected to a visual, such as a flashing light, and/or audible alarm 13 in the conventional manner whereby the alarm is activated when there is a rise or fall of the potential of electrodes 6 and 7 above or below, respectively, a predetermined characteristic base line voltage for an unpolluted airstream. A plurality of the system can be connected to a multi-channel recording means in the conventional manner and operated simultaneously to monitor any difference in the levels of pollutants in the airstreams of a plurality of locations. The housing shown at 12 for the electrochemical cell component, reservoir 3, conduit 4, and trap 11 can be made of any conventional or suitable materials to suit a given application, such as plastic or glass. Exemplary examples of the utilization of our above described method are as follows.

EXAMPLE 1

This example demonstrates the detection and/or monitoring of reducing substances in an airstream. An airstream is drawn into the above described system at a rate of 2 liters/min., and a solution of buffer, having a pH of approximately 8, is pumped into the system from reservoir 3 at the rate of 0.1 to 0.3 ml./min. by means of peristaltic pump 2 as described above. An electrical circuit 10 is attached to electrodes 6 and 7 to cause a current of approximately 2 μa. to flow through open-cell urethane foam pad 5, approximately ¼ inch thick and ⅜ inch in diameter, to provide a means of measuring the potential which is developed at electrodes 6 and 7. Under normal operating conditions for an unpolluted airstream, a voltage of 500–800 mv. is observed between the platinum electrodes. In the presence of low levels of sulfur dioxide, the voltage drops 20 to 400 mv. from its original level, depending on the level of sulfur dioxide present, which signifies the electrochemical oxidation of the sulfur dioxide or other reducible air pollutant at the platinum electrodes. By optimization of the cell operating parameters, it is possible to detect and/or monitor on a real time basis levels of sulfur dioxide or other airborne reducing substances in the range of 0.1 p.p.m. weight/volume or below.

EXAMPLE 2

This example demonstrates the detection and/or monitoring of enzyme inhibiting substances in an airstream. An airstream is drawn into the system as described in Example 1 above, a substrate solution consisting of $2 \times 10^{-4}$ M butyrylthiocholine iodide in tris buffer (0.1 M, pH 7.4) is pumped through the system at the rate of 0.1 to 0.3 ml./min. from reservoir 3. An electric current of about 2 μa. is applied to electrodes 6 and 7 above and below an enzyme pad containing immobilized cholinesterase, such as described in U.S. Pat. No. 3,515,644; the pad having a relatively large amount of open space so that both air and liquid may pass the electrodes simultaneously. The potential of electrodes 6 and 7 is monitored continuously and a characteristic baseline voltage is determined for that situation in which there is no enzyme inhibiting substance present in the atmosphere. When enzyme inhibiting substance, usch as organophosphate, is present in the atmosphere there is a rise in cell potential which can be used to trigger an alarm, as described above. This device responds rapidly to low levels of cholinesterase inhibitors, such as G and V agents.

EXAMPLE 3

This example demonstrates the detection and/or monitoring of oxidants, such as ozone, in an airstream. An airstream is drawn into the system as described in Example 1 above, and a solution of a reducing solution, such as $2.0 \times 10^{-4}$ M thiocholine iodide, is drawn into the system at the rate of 0.1 to 0.3 ml./min. from reservoir 3. Other reducing solutions, such as sodium sulfite, can be used in place of thiocholine iodide solution, and the particular reducing solution is selectable within the skill of the art. An electric current of about 2 μa. is applied to platinum electrodes 6 and 7 by circuit 10 above and below open-cell urethane foam pad 5. Low electrode potentials are observed in the absence of an oxidizing substance, such as ozone, and high potentials are obtained in the presence of an oxidizing substance, such as ozone, with the result that this apparatus makes it possible to monitor an airstream on a continuous basis for the presence of low levels of oxidizing substances.

While Examples 1, 2, and 3 are directed to sulfur dioxide, cholinesterase inhibitors, and ozone; our system and method can also be used to detect other reducing substances such as hydrogen sulfide, hydrazine, substituted hydrazine, aldehydes, ketones, nitric oxide, nitrous oxide, and nitrous anhydride; other enzyme inhibiting substances such as chlorine, mercury, lead, hydrogen sulfide, and hydrazine; and other oxidizing substances such as nitrogen tetroxide, nitric oxide, organic peroxides, and $H_2O_2$.

It is obvious that other modifications can be made of our invention, and we desire to be limited only by the scope of the appended claims.

We claim:

1. A method of continuously monitoring an airstream for the presence of pollutants therein comprising the steps of: turbulently mixing a sampling air stream and an electrically conductible pollutant absorbing solution in a conduit to effectively cause absorption of the pollutants in the airstream by the absorbing solution by forcing said air stream and said solution from individual conduit means of a combined cross-sectional flow area greater than that of said conduit; passing the absorbing solution-containing the pollutants in solution to an open cell material; passing an electrical current through electrical current measuring apparatus and an electrical circuit connected to a spaced cathode and an anode having said cell material interposed and monitoring any electrical current change caused by presence or non-presence of pollutants.

2. The method of claim 1 wherein the turbulence is created by passing the airstream and the absorbing solution from large diameter lines to the conduit having an inside diameter of about 0.070 of an inch.

3. The method of claim 1 wherein the open-cell material is urethane foam.

References Cited

UNITED STATES PATENTS

| 3,451,901 | 6/1969 | Seiger et al. | 204—1 T |
| 2,862,859 | 12/1958 | Grosskopf | 204—1 T |
| 3,403,081 | 9/1968 | Rohrback et al. | 204—1 T |

GERALD L. KAPLAN, Primary Examiner